United States Patent
Holzapfel et al.

(10) Patent No.: US 9,482,517 B2
(45) Date of Patent: Nov. 1, 2016

(54) OPTICAL POSITION-MEASURING DEVICE

(71) Applicant: DR. JOHANNES HEIDENHAIN GMBH, Traunreut (DE)

(72) Inventors: Wolfgang Holzapfel, Obing (DE); Jörg Drescher, Samerberg (DE); Markus Meissner, Übersee (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 14/508,473

(22) Filed: Oct. 7, 2014

(65) Prior Publication Data
US 2015/0098093 A1    Apr. 9, 2015

(30) Foreign Application Priority Data
Oct. 7, 2013 (DE) .......... 10 2013 220 196

(51) Int. Cl.
*G01B 11/14* (2006.01)
*G01B 9/00* (2006.01)
*G01J 1/04* (2006.01)
*G01D 5/347* (2006.01)

(52) U.S. Cl.
CPC ............. *G01B 11/14* (2013.01); *G01B 9/00* (2013.01); *G01D 5/34715* (2013.01); *G01J 1/0403* (2013.01)

(58) Field of Classification Search
CPC .... G01B 11/14; G01B 9/00; G01B 5/34715; G01J 1/0403
USPC ........... 356/637, 243.3–243.7, 237.1–237.6, 356/239.1–239.8, 614–624
See application file for complete search history.

(56) References Cited

U.S. PATENT DOCUMENTS

| | | | |
|---|---|---|---|
| 3,842,668 A * | 10/1974 | Lippke | G01N 33/346 200/61.13 |
| 7,483,120 B2 | 1/2009 | Luttikhuis et al. | |
| 7,573,581 B2 | 8/2009 | Holzapfel | |
| 7,733,476 B2 * | 6/2010 | Kanzaki et al. | 356/237.4 |
| 9,013,710 B2 | 4/2015 | Hermann | |

(Continued)

FOREIGN PATENT DOCUMENTS

| | | |
|---|---|---|
| EP | 1 762 828 | 3/2007 |
| EP | 1 826 615 | 8/2007 |

(Continued)

OTHER PUBLICATIONS

European Search Report issued in European Patent Application No. 14 17 9262, dated Feb. 17, 2015.

(Continued)

*Primary Examiner* — Tri T Ton
(74) *Attorney, Agent, or Firm* — Andrews Kurth Kenyon LLP

(57) ABSTRACT

An optical position-measuring device includes a measuring standard as well as a scanning unit movable relative to it along at least one measuring direction, a scanning beam path being formed between the measuring standard and scanning unit and being used to generate displacement-dependent signals. A protective cap is disposed in a manner allowing movement along an axis perpendicular to the measuring-standard plane such that in at least one operating mode, the protective cap for the most part surrounds the scanning beam path between the scanning unit and measuring standard.

34 Claims, 5 Drawing Sheets

(56) References Cited

U.S. PATENT DOCUMENTS

2004/0201841 A1* 10/2004 Kim et al. .................. 356/237.3
2011/0141451 A1 6/2011 Yamaguchi et al.

FOREIGN PATENT DOCUMENTS

EP 2 520 906 11/2012
GB 475323 11/1937

OTHER PUBLICATIONS

Gao, W. et al., "A Three-axis Displacement Sensor with Nanometric Resolution", Annals of the CIRP, vol. 56, Jan. 2007.
European Search Report issued in European Patent Application No. 14 185 044.6, dated Mar. 24, 2015.

* cited by examiner

OPTICAL POSITION-MEASURING DEVICE

CROSS-REFERENCE TO RELATED APPLICATIONS

The present application claims priority to Application No. 10 2013 220 196.6, filed in the Federal Republic of Germany on Oct. 7, 2013, which is expressly incorporated herein in its entirety by reference thereto.

FIELD OF THE INVENTION

The present invention relates to an optical position-measuring device, which is, for example, suitable for extremely precisely determining the relative position of two objects movable relative to each other.

BACKGROUND INFORMATION

In wafer scanners of new generation, grating-based optical position-measuring devices are used to measure the position of the moving wafer table relative to a fixed so-called metrology frame. In that context, the scanning units of the respective position-measuring devices are located on the moving wafer table or traversing table and measure its position in all six spatial degrees of freedom. Such wafer scanners are highly dynamic machines, that is, the moving wafer table moves with traversing velocities v>1 m/s and is accelerated with a multiple of the gravitational acceleration. At the same time, the demands in terms of measuring accuracy on the optical position-measuring devices used are in the range of a few atomic diameters.

In order to realize the accuracies called for, interferentially operating position-measuring devices as described, for example, in European Published Patent Application No. 1 762 828 and U.S. Pat. No. 7,573,581, each of which is expressly incorporated herein in its entirety by reference thereto, are used on the wafer table. In such position-measuring devices, a scanning beam path is formed between a measuring standard and a scanning unit and is used to generate displacement-dependent signals. To that end, light is emitted by a scanning unit to the measuring standard, where it is split into $+/-1^{st}$ orders of diffraction or diffraction arms. The spatially separate orders of diffraction are reversed in direction in the scanning unit, and arrive again at the measuring standard, where they interfere. The resultant interference signal may then be evaluated with regard to the position of the objects movable relative to each other.

The position information is encoded in the phase relation of the two orders of diffraction relative to each other. The result is that, in addition to the position phase of the diffraction grating of the measuring standard, the phase lag of the two diffraction arms relative to each other also goes into the measured position value. For example, this phase lag is influenced by variations in the refractive index, which come about due to air turbulences between the measuring standard and scanning unit, whose expansion is less than the distance of the two orders of diffraction relative to each other. These turbulences in turn are caused mainly by the movement of the wafer table on which a plurality of scanning units are usually located. This position noise, or jitter, produced by air turbulences, is the cause for the greatest portion of non-correctable errors of grating-based position-measuring devices in highly dynamic machines. This being the case, the problem faced in such practical applications is to minimize or even completely eliminate this share of errors in the position measurement.

In typical, interferentially operating, optical position-measuring devices, the measuring standard is illuminated by a collimated beam of rays having a diameter of 1 to 3 mm. Typical angles of diffraction of the partial beams of rays of first order of diffraction reflected back by the measuring standard amount to 15 to 30°. The separation of the two orders of diffraction, which are used to generate the phase information of interest, thus increases with the distance to the measuring standard according to the following mathematical interrelationship:

$$d=2*\tan(\phi)*h$$

where d represents the spacing of the two partial beams of rays, $\phi$ represents the diffraction angle of one order of diffraction, and h represents the distance to the measuring standard.

The size of individual areas having the same refractive index (size of the turbulence) in the case of air moving with a flow velocity of approximately 1 m/s is typically 2 to 5 mm.

Variations in the refractive index enter significantly into the measured phase when the spatial separation of the two later-interfering partial beams of rays is greater than the size of the turbulence. Partial beams of rays which substantially overlap and whose spatial separation is markedly smaller than the size of the turbulence see the same refractive-index variation, so that no position measuring error results.

For typical systems, the measured position is thus not a function of variations in the refractive index, so long as this variation is limited to areas in the immediate vicinity of the measuring standard:

$$d<<r_T,$$

and therefore:

$$h<<r_T/(2*\tan(\Phi)),$$

typically $$h<<1.7 \text{ mm}$$

In these equations, $r_T$ represents the size of areas having the same refractive index.

Consequently, in proximity of the measuring standard up to a distance d≈1.7 mm, the separation of the two partial beams of rays is smaller than the typical size $r_T$ of an area having homogeneous refractive index, so that no further measures are necessary to stabilize the refractive index in this area. In areas which are further away from the measuring standard, the partial beams of rays diffracted back by the measuring standard are separated so far spatially from each other that they see different air turbulences, and these air turbulences may lead to different variations in the refractive index and consequently to fluctuations in the position values measured.

To address the problem described above, it is therefore necessary to keep the refractive index homogeneous in the area between the scanning unit up to a distance of approximately 1 mm from the measuring standard. Homogenization is not absolutely necessary in the immediate vicinity of the measuring standard.

A simple manner of reducing this unwanted influence is to minimize the scanning distance between the measuring standard and the scanning unit. Thus, the air is only able to disturb in a small volume, and the accumulated phase error is slight. The aim in doing this would be to limit the free air volume to the extent that all beams of rays in the scanning beam path lie so close together that the typical size of an air turbulence exceeds this expansion. Thus, all beams of rays see approximately the same refractive index. However, the necessity of a large scanning distance in certain locally limited areas of the machine, e.g., in order to create the space necessary for a robot arm in the case of wafer exchange or the like, and thus to avoid collisions, often runs contrary to this. A large scanning distance is likewise necessary in certain operating conditions when, for example, a traversing table having greater initial tilting tolerances (since not yet regulated to the position-measuring devices) is moved under the plates having the measuring standards, e.g., when shifting the wafer table from one position in the machine to another, or else when the table must execute an emergency stop. However, all these situations take place in an operating mode of the machine which does not demand the highest accuracy or in which the table is moved with markedly lower traversing velocities, and thus the air turbulences are considerably less.

To address this problem, it is conventional to condition the air in the optical beam path by what are referred to as air showers. The attempt is thereby to generate the most homogeneous as well as constant refractive index as possible in the scanning beam path of the position-measuring device. This conditioning may be accomplished in two manners.

First of all, for instance, the air may be conditioned in the complete travel range of the wafer table, as is done in the case of interferometers, for example. When working with grating-based position-measuring devices, however, the measuring volume may also be conditioned only locally between the scanning unit and measuring standard. The aims of these air showers are to reduce slow and large or spatially broadly expanded variations in refractive index, and secondly, to avoid other air turbulences due to the movement of the traversing table, which is accomplished by as laminar a flow as possible and/or shielding of the air pushing between the scanning unit and the measuring standard due to the movement of the traversing table, by the air flow from the air shower. Comparatively great flow velocities of the air are necessary to achieve these goals. The disadvantage in such a solution is that the air cannot be perfectly homogenized. Due to the movement of the wafer table, local turbulences still arise, and thus variations in the refractive index, which produce deviations in position. In addition, due to the high flow velocities out of the air shower regardless of the traversing velocity of the wafer table, variations in the refractive index arise which result in a generally higher measuring noise.

Secondly, it is possible to reduce the variations in refractive index by employing special gases whose refractive index is less dependent on the pressure. Operation in vacuum is also possible. However, both solutions are only made possible by a very great degree of technical complexity.

The current possibilities for conditioning the air thus limit the position accuracy of the position-measuring devices used, and represent the greatest remaining portion of measuring error in determining position.

SUMMARY

Example embodiments of the present invention provide an optical position-measuring device in which the share of errors in the position measurement resulting due to movement-induced refractive-index variations in the scanning beam path may be eliminated or at least minimized.

According to an example embodiment of the present invention, an optical position-measuring device includes a measuring standard as well as a scanning unit movable relative to it along at least one measuring direction, a scanning beam path being formed between the measuring standard and scanning unit and being used to generate displacement-dependent signals. A protective cap is disposed in a manner allowing movement along an axis perpendicular to the measuring-standard plane such that in at least one operating mode, the protective cap for the most part surrounds the scanning beam path between the scanning unit and measuring standard.

The distance between the protective cap and the measuring standard: is adjustable in a first operating mode to a distance value such that the protective cap shields the scanning beam path between the scanning unit and measuring standard at least in the spatial area in which it is sensitive to variations in the refractive index; and in at least a second operating mode, is adjustable to a larger distance value than in the first operating mode.

In this context, it may be provided to integrate an air bearing into the protective cap, via which a constant distance value is able to be set between the protective cap and the measuring standard in the first operating mode.

It is possible to provide magnetic or pneumatic actuator to position the protective cap in defined manner along the axis.

In doing this, the distance between the protective cap and measuring standard may be held constant regardless of the position of a traversing table on which the scanning unit is located.

The protective cap may include a resetting device, which, in response to a failure of the energy supply, automatically sets a maximum possible distance between the protective cap and the measuring standard.

In this case, the resetting device may include spring elements via which the protective cap is able to be preloaded mechanically.

Moreover, it is possible to shape the outer contour of the protective cap such that no air turbulences occur due to the air circumflowing the protective cap.

It may further be provided to shape the outer contour of the protective cap such that no forces result on the measuring standard due to the air circumflowing the protective cap.

At least one flow element may be disposed on the protective cap, the flow element being arranged such that the ram and suction pressure on the protective cap cancels out with the dynamic pressures on the flow element at a certain velocity of the traversing table on which the scanning unit is located.

In this connection, the flow element may take the form of an air baffle disposed on the side of the protective cap.

Moreover, it is possible to dispose the protective cap in a manner allowing it to rotate about an axis perpendicular to the plane of the measuring standard.

In addition, it is possible for the protective cap to extend along the axis perpendicular to the measuring-standard plane, and to have an extension along this axis that is slightly less than the distance between the measuring standard and the scanning unit.

The protective cap may be cylindrical, the cylinder axis extending along the axis perpendicular to the measuring-standard plane.

Moreover, on its side facing the measuring standard, the protective cap may have an aperture or a light-transmitting cover element.

In the optical position-measuring device, measuring errors due to refractive-index variations of the air may be minimized in operating modes with small distance necessary between the traversing table having the scanning unit and the measuring standard in applications in which in further operating modes, an enlarged scanning distance is necessary.

Static and changing forces on the measuring standard and/or the traversing table, which are produced by air moving relative to the traversing table, may be reduced. For example, this may be achieved by a suitably formed aerodynamic or sail-like contour of the protective cap.

Moreover, the influence of thermal fluctuations of the ambient air on the position-measuring device, e.g., temperature drift, may be reduced by the measures described herein.

Further features and aspects of example embodiments of the present invention are described in more detail below with reference to the appended Figures.

DETAILED DESCRIPTION

The basic consideration of the optical position-measuring device is to largely enclose the complete beam volume of the position-measuring device via a protective cap in at least one operating mode, and thus to shield it from the ambient air. Consequently, the scanning beam path between the measuring standard and the scanning unit is shielded and surrounded by the protective cap at least in the spatial area in which it is sensitive to variations in the refractive index. The enclosure is provided close to the surface of the measuring standard, so that only a small gap remains there in which possible variations in the refractive index generate no significant position errors. In this operating mode, no air turbulence exists within the area of the scanning beam path between the measuring standard and scanning unit enclosed and shielded by the protective cap. The refractive index in the beam volumes is nearly constant and therefore generates no high-frequency position jitter.

In those areas and operating situations in which a large scanning distance is needed in the optical position-measuring device, the protective cap may be lowered and the position-measuring device may be operated in the other respective operating modes without swinging the protective cap in between the measuring standard and scanning unit.

If, because of the high dynamics of the machine or due to operating states occurring suddenly, e.g., in the case of an emergency braking, the large scanning distance must be produced very quickly, then the protective cap may be lowered rapidly by suitable resetting device, e.g., via mechanical preloading in the bearing of the protective cap. A maximum possible distance is thereby set automatically between the protective cap and the measuring standard so that, for example, in the event the energy supply fails, the protective cap is moved away automatically from the measuring standard.

Figure 1:
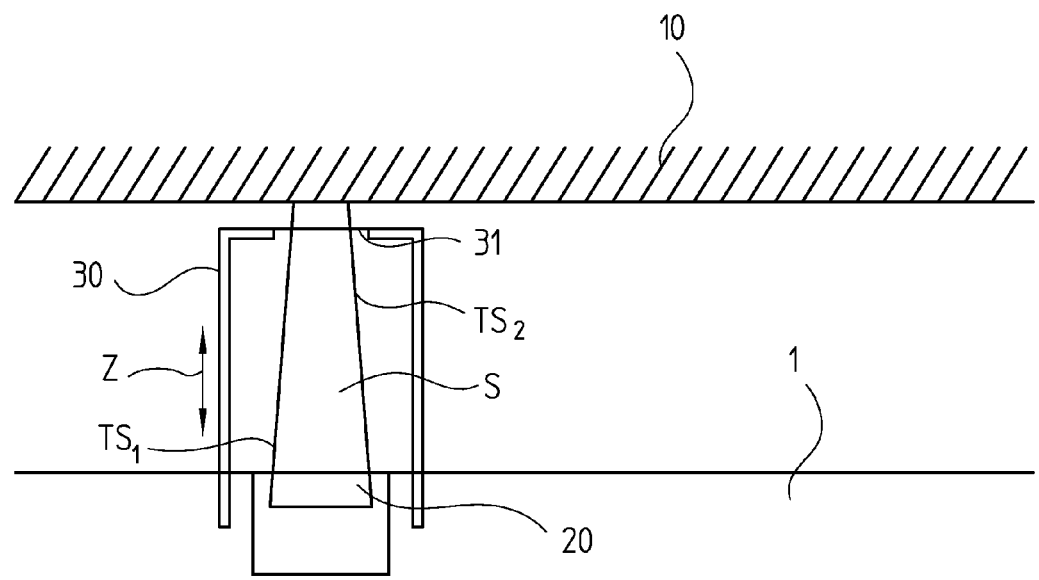
FIG. 1 schematically illustrates an optical position-measuring device according to an example embodiment of the present invention.

An optical position-measuring device according to a first exemplary embodiment of the present invention is schematically illustrated in FIG. 1. It includes a measuring standard 10 as well as a scanning unit 20 which are disposed on machine parts movable relative to each other along at least one measuring direction. Measuring standard 10 is scanned optically via scanning unit 20, and in this manner, generates displacement-dependent signals for a machine control. Of the optical scanning, i.e., of the scanning beam paths used, only two laterally bounding partial beams of rays $TS_1$, $TS_2$ are illustrated in FIG. 1. With regard to a suitable scanning, reference is made, for example, to European Published Patent Application No. 1 762 828 and to U.S. Pat. No. 7,573,581, each of which is expressly incorporated in herein in its entirety by reference thereto. In this context, for example, a light source, various optical elements, such as lenses, gratings, etc., as well as a detector system may be provided in scanning unit 20 for forming a scanning beam path to generate the displacement-dependent signals. It is also possible to connect the light source and/or detector system to the scanning unit with the aid of optical fibers. It should be understood that a specific type of optical scanning is not required.

In the present exemplary embodiment, the optical position-measuring device is employed in a machine for manufacturing semiconductors, e.g., in a wafer scanner. In this case, scanning unit 20 is disposed on a traversing table, i.e., wafer table 1, which is movable along at least one measuring direction relative to measuring standard 10 on a stationary machine part. In the illustrated example, the measuring direction of the position-measuring device extend horizontally in the drawing plane.

As mentioned above, the optical position-measuring device includes a protective cap 30 which is disposed in a manner allowing movement along an axis perpendicular to the measuring-standard plane. This axis is indicated by reference character z. As illustrated, in a first operating mode, protective cap 30 surrounds the scanning beam path between measuring standard 10 and scanning unit 20, that is, beam volume S in this area, and thus shields it against possible variations in the refractive index of the air. On the side facing measuring standard 10 in the present exemplary embodiment, protective cap 30 has a cover element 31 in the form of a transparent glass cover which closes protective cap 30 on this side.

At least two possible positions along axis z are provided for protective cap 30, which it may occupy in different operating modes.

In a first position, i.e., in a first operating mode, protective cap 30 is extended or swung upward to the maximum in the direction of measuring standard 10 in order to shield the scanning beam path, that is, beam volume S between scanning unit 20 and measuring standard 10 to a great extent, and to minimize the noise, or jitter, mentioned above, caused by variations in the refractive index. Thus, in the first operating mode, as minimal a value as possible is set for the distance between the top edge of protective cap 30 and measuring standard 10 along axis z.

On the other hand, in a second position, that is, in at least a second operating mode, protective cap 30 is retracted or swung out completely downward in the direction of scanning unit 20, in order to free beam volume S above scanning unit 20. In this operating mode, a greater distance is thus provided between measuring standard 10 and the top edge of protective cap 30 than in the first operating mode.

In the present exemplary embodiment of the position-measuring device, the distance necessary between protective cap 30 and measuring standard 10 for the respective operating modes may be set via a control unit.

At least for swinging protective cap 30 in in the first operating mode, the optical position-measuring device includes suitable actuator(s) that may be implemented in greatly varied manner, as illustrated in the following variants.

Figure 2:
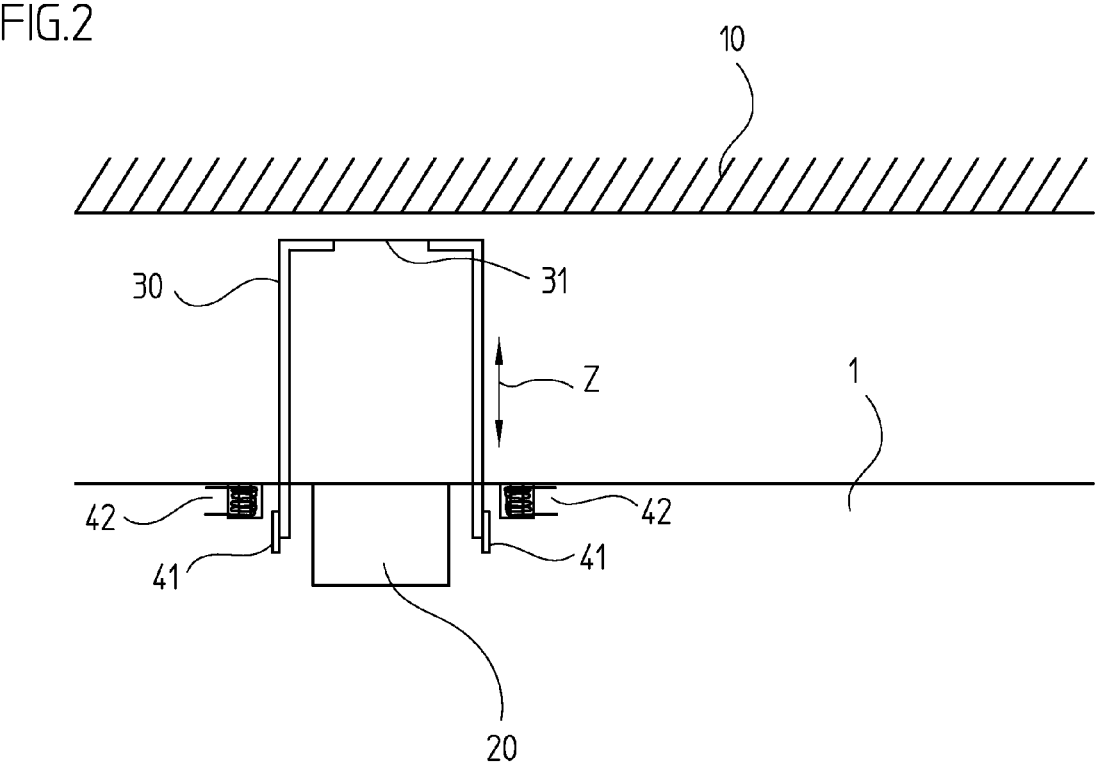
FIG. 2 schematically illustrates a variant of the optical position-measuring device.

FIG. 2 schematically a first variant of the optical position-measuring device, in which a magnetic mount of protective cap 30 or magnetic actuator device(s) are provided to position the protective cap along axis z. Via electromagnets 42, disposed on wafer table 1, which interact with indicated magnet elements 41, e.g., taking the form of ferromagnetism or paramagnets, on protective cap 30, protective cap 30 is able to travel upward in the first operating mode mentioned, and be kept swung into the scanning beam path. In this operating mode, the scanning beam path is thereby able to be shielded against refractive-index variations in the surrounding air.

Figure 3:
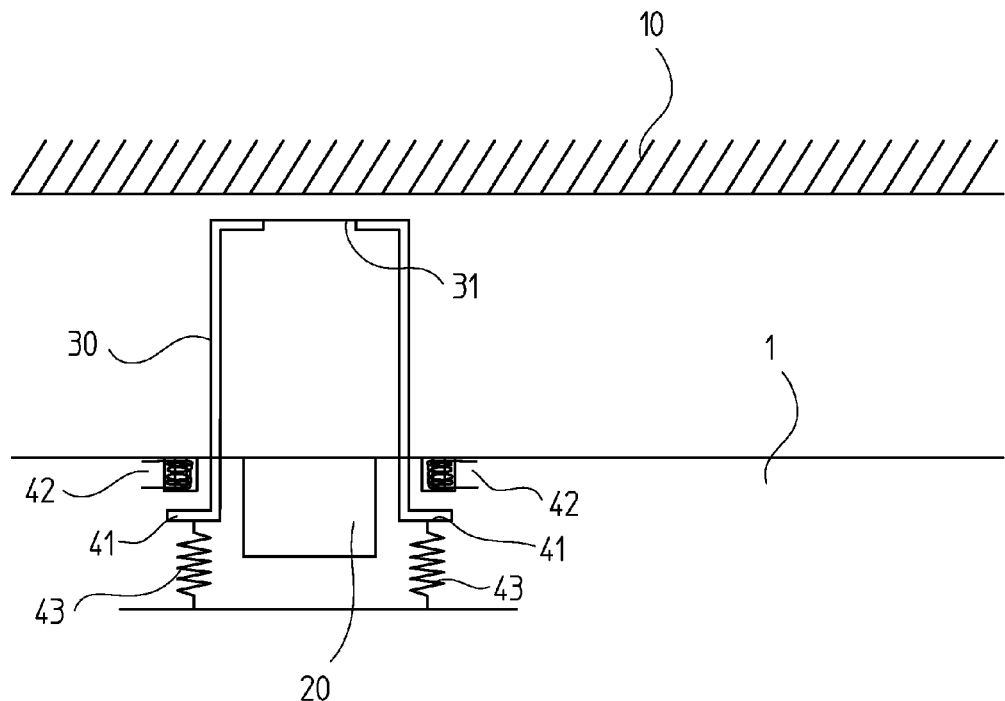
FIG. 3 schematically illustrates another variant of the optical position-measuring device.

Moreover, as an option, the generating of a mechanical preloading along the z-direction may be provided for protective cap 30, in order to move protective cap 30 away from measuring standard 10 quickly, e.g., in the event of an emergency stop or a failure of the energy supply, so that it does not damage measuring standard 10. A respective second variant of the optical position-measuring device is illustrated in FIG. 3. Reference numerals 43 denote spring elements, which are located between protective cap 30 and wafer table 1 stationary in the z-direction, and which act as resetting devices via which protective cap 30 is able to be preloaded mechanically. This variant offers the advantage that in the event the energy supply fails or in response to an emergency stop, protective cap 30 is moved automatically and quickly away from measuring standard 10, and thus a maximum possible distance is set automatically between protective cap 30 and measuring standard 10.

Figure 4:
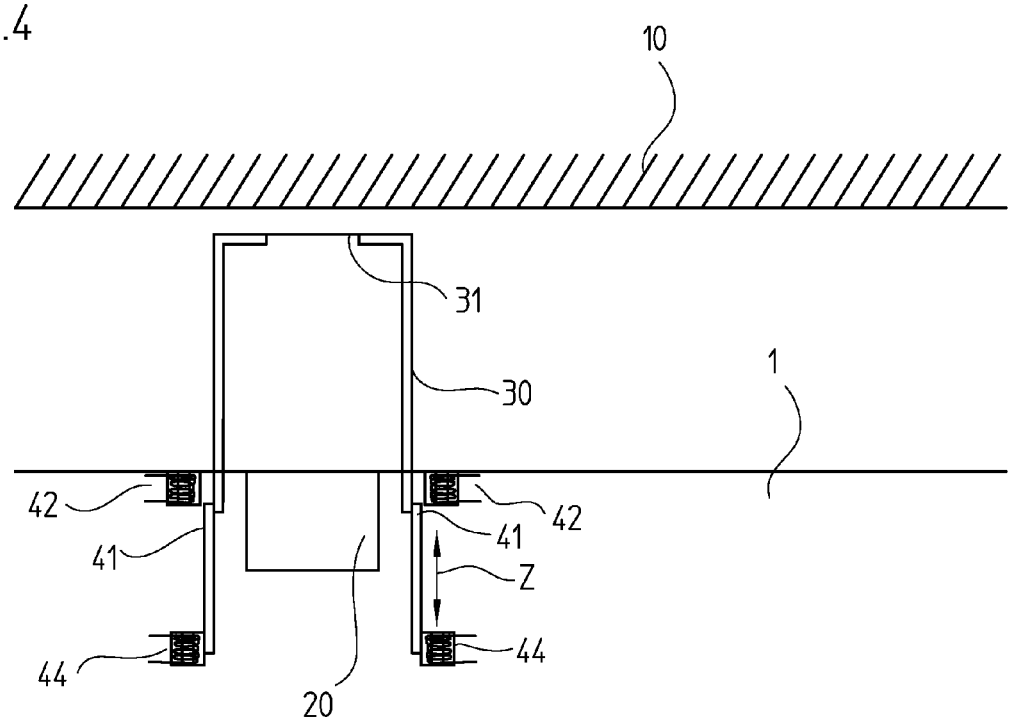
FIG. 4 schematically illustrates a further variant of the optical position-measuring device.

In a further variant of the optical position-measuring device illustrated in FIG. 4, additional electromagnets 44 may be provided in wafer table 1 as further magnetic actuators in order to lower protective cap 30 quickly, that is, to remove it from the scanning beam path. In this variant, electromagnets 44, provided in addition to electromagnets 42 for swinging in protective cap 30, are disposed in the z-direction, e.g., along the moving direction of protective cap 30, set apart from electromagnets 42. On the part of protective cap 30, suitably formed magnet elements 41 are disposed which interact with various electromagnets 42, 44.

Figure 5:
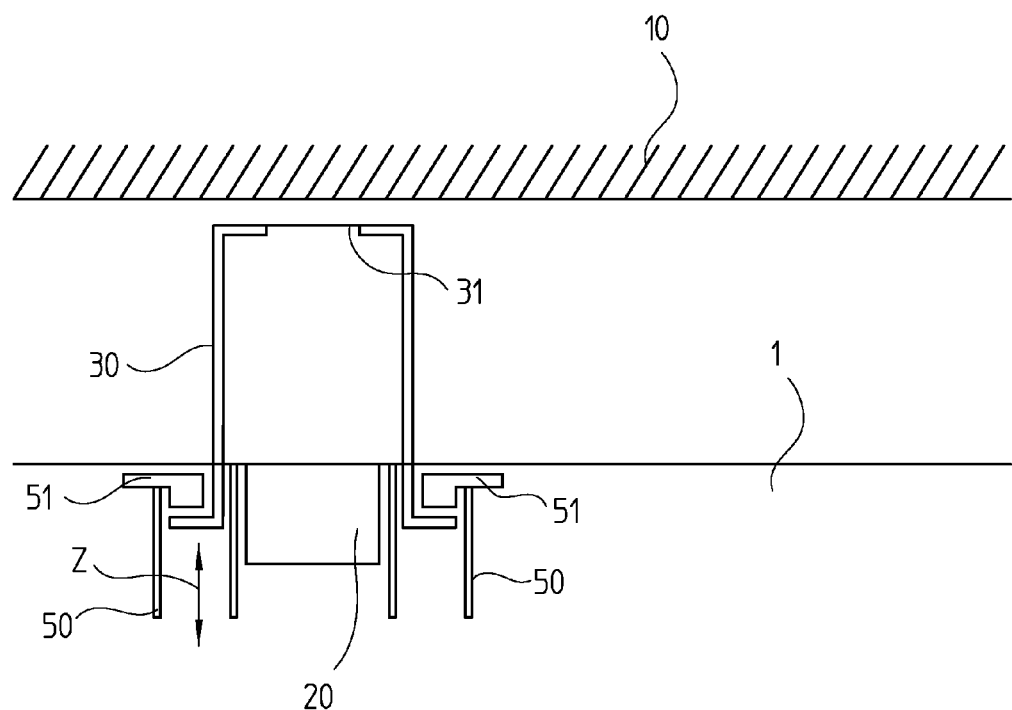
FIG. 5 schematically illustrates another variant of the optical position-measuring device.

A further variant of the optical position-measuring device is schematically illustrated in FIG. 5. Via the pneumatic actuator(s), a vacuum suction of protective cap 30 in the direction of measuring standard 10 is provided in the first operating mode, and a lowering of protective cap 30 via an air overpressure is provided in a second operating mode. In this case, protective cap 30 is linked to one or more pneumatic cylinders 50, which are connected with suitable compressed-air lines or vacuum lines 51.

Figure 6:
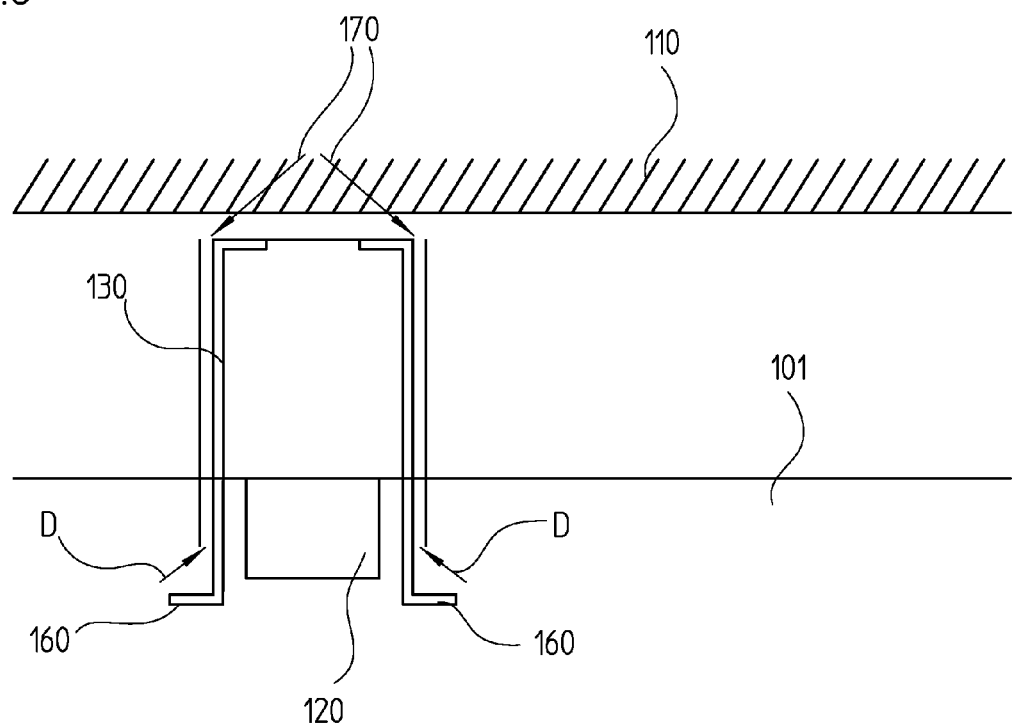
FIG. 6 schematically illustrates an optical position-measuring device according to an example embodiment of the present invention.

An optical position-measuring device according to an example embodiment of the present invention is explained below with reference to FIG. 6.

Since the traversing table or wafer table 101 is usually also moved vertically, that is, along the z-direction toward or away from measuring standard 110, in the case of a protective cap 130 having only two positions provided, the distance between protective cap 130 and measuring standard 110 may only be selected to be so small that even in extreme positions (e.g., upon tilting of wafer table 101), it does not touch measuring standard 110. Consequently, the distance in the normal position of wafer table 101 is not optimal, however, and the remaining air gap is different depending on the posture of wafer table 101. During operation, this leads to variable influences of the air on the measured position. Therefore, in the first operating mode, the distance between the top edge of protective cap 130 and measuring standard 110 may be set to a minimal and constant distance value. In this manner, the disturbance influence exerted on the scanning beam path always remains the same, and in particular, remains minimal in all states of motion of wafer table 101. In order to set such a constant distance value, in this exemplary embodiment, an air bearing 170 is integrated into protective cap 130, and specifically, in the boundary region between measuring standard 110 and protective cap 130. The distance between the top edge of protective cap 130 and measuring standard 110 is obtained automatically by the dimensioning of air bearing 170, and is dependent only slightly on the pressure of protective cap 130 upward.

If, in the specific application case, air bearing 170 operates in the direction of the force of gravity, that is, the pressure of air bearing 170 has the same direction as the force of gravity, then air bearing 170 must additionally be preloaded mechanically. To that end, mechanical preloading elements 160, illustrated schematically in FIG. 6, are provided on protective cap 130. A constant distance value between protective cap 130 and measuring standard 110, e.g., thus between the top edge of protective cap 130 and measuring standard 110, is then set via air bearing 170 itself.

Because of air bearing 170, protective cap 130 automatically follows the movements of wafer table 101 and measuring standard 110, respectively, i.e., for example, corresponding tilting motions and/or a displacement along the z-direction. Via the air bearing of protective cap 130, not only is the distance between protective cap 130 and measuring standard 110 able to be kept constant, but also the angle between protective cap 130 and measuring standard 110 in the event of a possible tilting of wafer table 101 may be kept constant. This is accomplished by disposing protective cap 130 in a manner allowing not only movement along the axis or direction Z, but also rotation to a small degree about the two axes X and Y oriented perpendicularly to it. In response to a tilting of wafer table 101, because of the preloading, protective cap 130 will automatically rotate such that air bearing 170 along protective cap 130 has a constant distance to measuring standard 110.

In this context, the pressure of protective cap 130 on measuring standard 110 via air bearing 170 may be held constant by suitable preloading, e.g., via preloading devices such as magnets or springs. Preloading elements 160 on protective cap 130, illustrated schematically in FIG. 6, then interact with these preloading devices. Incidentally, the force acting on measuring standard 110 may be kept constant in this manner, as well. Otherwise, the resultant pressure of protective cap 130 in the Z-direction on measuring standard 110 could lead to a deformation of it and corresponding measuring errors. If the preloading is produced by active preloading devices such as via an electromagnet, for example, then these devices may be used at the same time as actuator(s) for the rapid lowering of protective cap 130 in the second operating mode. With the aid of such a preloading, elevation of protective cap 130 in the direction of measuring standard 110 in the first operating mode is also possible in those cases in which measuring standard 110 is mounted above scanning unit 120.

Figure 7:
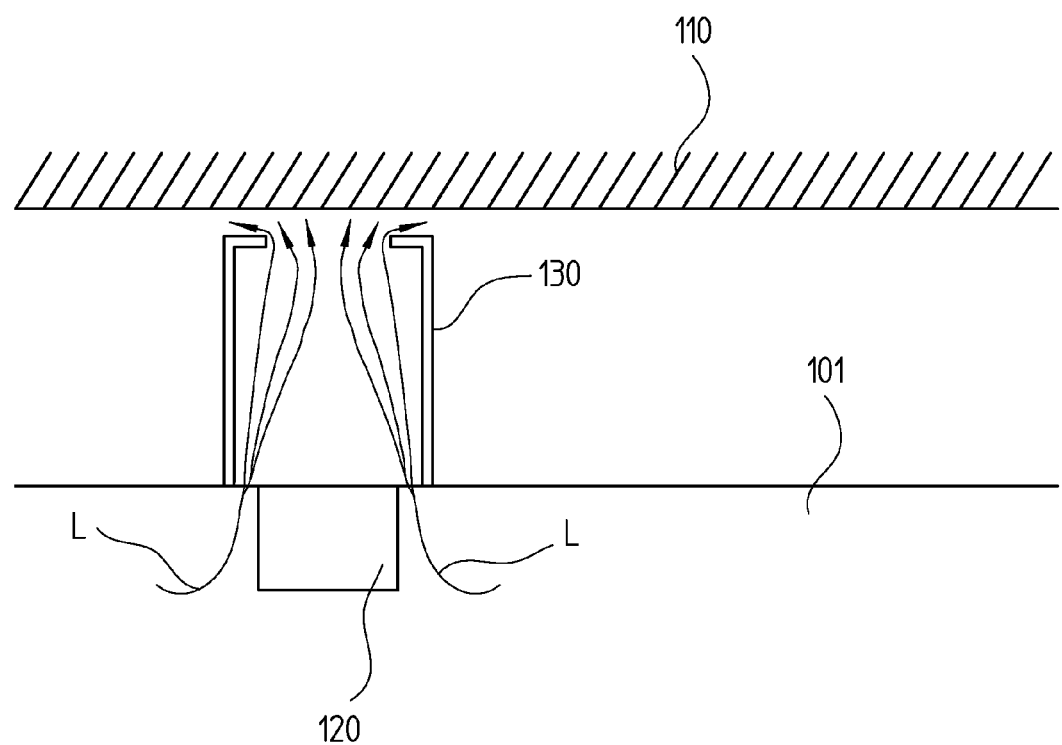
FIG. 7 schematically illustrates a variant of the optical position-measuring device.

Protective cap 130 may also be raised in the first operating mode by an air overpressure with the aid of pneumatic actuator(s), as illustrated in FIG. 7. In this context, by a suitable configuration, air L used for the elevation and preloading may at the same time be used in an air bearing. In this instance, the structure in protective cap 130 is implemented such that a steady state is achieved. Variations in refractive index are thereby minimized and measuring error or position noise is reduced. In addition, outer influences by local heat sources are avoided by this form of bearing.

In certain practical applications, it is important that no force is introduced onto the measuring standard by the wafer table, e.g., by resultant ram and suction pressure during the movement of the wafer table. An additional protective cap which is moved only at a minimal distance away from the measuring standard may possibly have a negative effect in this case. It is therefore advantageous if the force which is produced by the displacement of the air through the protective cap and which is exerted on the measuring standard via the protective cap is minimized to the greatest extent possible.

First of all, this may be accomplished by an aerodynamic form of the protective cap, by which the ram and suction pressure owing to the movement of the wafer table is minimized. Moreover, due to this aerodynamic construction, turbulences may be avoided which can form in the moving direction behind the protective cap and by which variable pressures associated with them exert a changing force on the wafer table and the measuring standard.

Secondly, by a suitably designed flow element in the form of a structure which is mounted on the side of the protective cap, in response to a movement of the wafer table, air may be conducted toward and away from the measuring standard such that in total, the force exerted by the moving air on the measuring standard is offset.

The structure mentioned and/or aerodynamic form of the protective cap may be mounted and optimized such that the force produced by air displacement of the wafer table is minimized in the main moving direction of the wafer table in which the greatest accuracy is required. Alternatively, the protective cap may also be rotatably mounted and adapted in its orientation to the moving direction of the wafer table.

This may be accomplished either by suitable shaping of the outer contour of the protective cap, or else with the aid of suitably formed flow elements such as a suitably formed structure which is mounted on the side of the protective cap. Preferably, the flow element or the structure is formed such that the ram and suction pressure on the protective cap cancels out with the dynamic pressures on the flow element at a certain velocity of the wafer table due to displacement of the air. In this context, the flow element may be mounted such that it is circumflowed by the head wind during movement of the wafer table.

Figure 8:
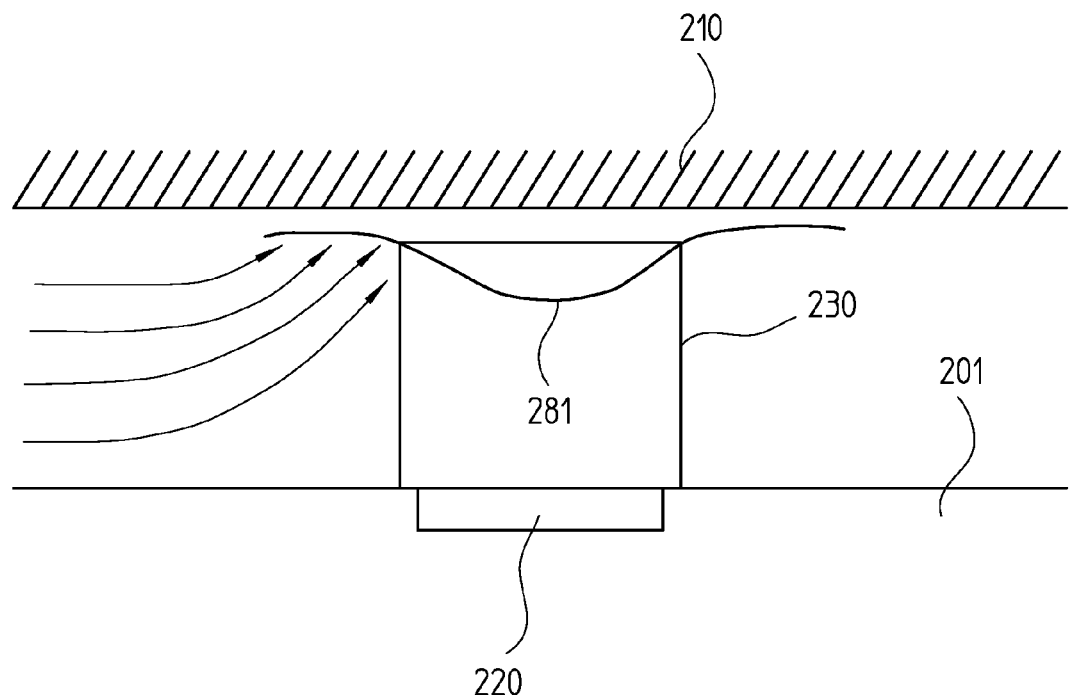
FIG. 8 schematically illustrates another variant of the optical position-measuring device.

The operating principle of a flow element in the form of an air baffle in the optical position-measuring device is schematically illustrated in FIG. 8. Air baffle 281 is used to intercept the air, which presses on measuring standard 210, and introduce this force onto wafer table 201. The force acting on measuring standard 210 is reduced in this manner.

In applications in which highly accurate positioning of the wafer is necessary, the wafer table is often constructed in two parts. A first traversing table takes over the large traversing movements for a coarse positioning. Disposed on this first traversing table is a second traversing table which takes over the fine positioning of the wafer. The second traversing table is able to be moved only to a slight degree relative to the first traversing table and thereby corrects the system deviations of the first coarse traversing table. In the case of a two-part traversing table, the protective cap may be mounted on the first traversing table. The forces which arise due to the movement of the protective cap as well as the air circumflowing the protective cap are thereby diverted to the first traversing table and do not influence the second traversing table responsible for the precise positioning.

It should be understood that variations to the example embodiments described above may be made without departing from the spirit and scope hereof. Before explaining such individual possibilities, it is specifically pointed out that it is possible to combine the measures, explained on the basis of the different exemplary embodiments and variants, suitably with each other depending upon, e.g., system requirements.

In addition, instead of the transparent cover element described above, the protective cap may have an aperture or else a diaphragm stop toward the measuring standard. In this context, a beam volume terminated by a cover element may be more favorable for the steadiest state possible of the air in the interior of the protective cap, and in the case of only two necessary positions of the protective cap, represents a preferred variant.

Figure 9:
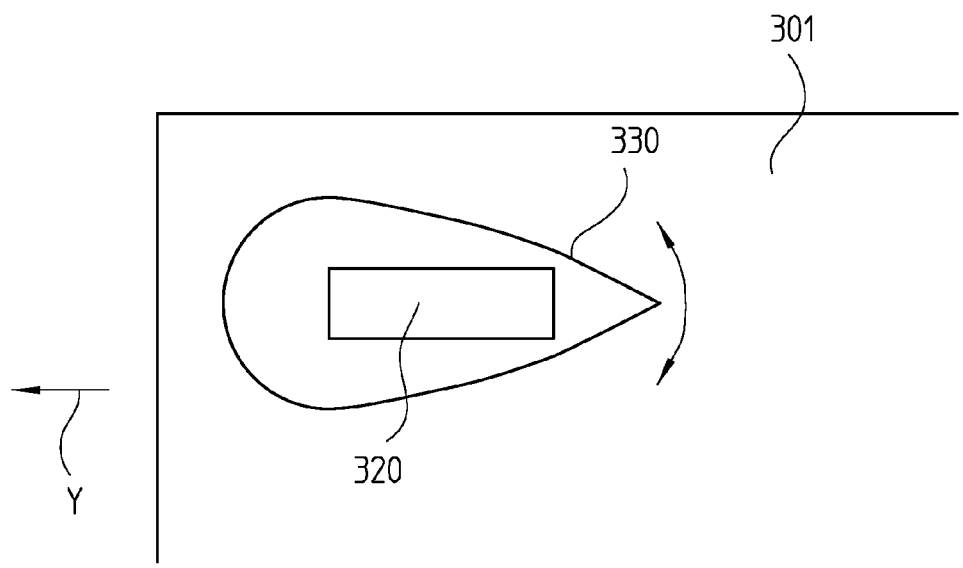
FIG. 9 schematically illustrates a further variant of the optical position-measuring device.

According to the top view illustrated in FIG. 9, the outer contour of protective cap 330 may be shaped such that it is aerodynamic along the main moving direction Y of wafer table 301. Because of this, a minimal force or a minimal torque causing tilting acts on wafer table 301. The aerodynamic shape or contour of protective cap 330 also leads to smaller turbulences, that is, the disturbing forces on protective cap 330 and therefore on wafer table 301 are reduced considerably in this manner. Ideally, the shape of protective cap 330 permits a laminar flow along protective cap 330. Preferably, the shape or contour of protective cap 330 is optimized only for a main moving direction of wafer table 301.

Should both main moving directions of wafer table 301 require high measuring accuracies, then protective cap 330 may also be mounted in a manner allowing rotation about its longitudinal axis, i.e., about an axis perpendicular to the plane of the measuring standard. Due to its form, it then automatically follows the respective moving direction and minimizes turbulence-induced disturbing forces on wafer table 301 for all moving or traversing directions.

In general, the protective cap may be advantageous if the wafer table or the optical scanning beam path is subject to changing thermal stresses. Due to the shielding resulting via the protective cap, not only is the moving air kept out of the beam volume, thermal radiation may also be blocked off, e.g., by inserting an insulation. The air inside of the protective cap thus remains in a constant steady state, and the position noise and position drift in the measured signals are reduced significantly.

In order to avoid unnecessary waiting times when lowering the protective cap, e.g., for loading and/or unloading a wafer, the protective cap may already be lowered on the trip to the loading station.

In cases in which the traversing table or wafer table is formed of two parts as explained above, and includes a first traversing table and a second traversing table, the protective cap may be mounted on the less precise first traversing table. The action of force by the air on the protective cap thus does not act directly on the precise second traversing table. In addition, forces which would act through the air on the scanning unit without the protective cap are blocked by the protective cap.

What is claimed is:

1. An optical position-measuring device, comprising;
a measuring standard;
a scanning unit movable relative to the measuring standard along at least one measuring direction, a scanning beam path being formed between the measuring standard and scanning unit; and
a protective cap movable along an axis perpendicular to a measuring-standard plane such that in at least one operating mode, the protective cap surrounds the scanning beam path between the scanning unit and measuring standard at least in a spatial area in which the scanning beam path is sensitive to variations in refractive index.

2. An optical position-measuring device, comprising:
a measuring standard;
a scanning unit movable relative to the measuring standard along at least one measuring direction, a scanning beam path being formed between the measuring standard and scanning unit; and
a protective cap movable along an axis perpendicular to a measuring-standard plane such that in at least one operating mode, the protective cap surrounds the scanning beam path between the scanning unit and measuring standard at least in a spatial area in which the scanning beam path is sensitive to variations in refractive index;
wherein a distance between the protective cap and the measuring standard: is adjustable in a first operating mode to a distance value such that the protective cap shields the scanning beam path between the scanning unit and measuring standard at least in a spatial area sensitive to variations in the refractive index; and in at least a second operating mode, is adjustable to a greater distance value than in the first operating mode.

3. The position-measuring device according to claim 2, wherein the protective cap includes an integrated air bearing adapted to set a constant distance between the protective cap and the measuring standard in the first operating mode.

4. The position-measuring device according to claim 1, further comprising magnetic and/or pneumatic actuators adapted to position the protective cap in defined manner along the axis.

5. The position-measuring device according to claim 4, wherein the actuators are adapted to maintain a constant distance between the protective cap and the measuring standard regardless of a position of a traversing table on which the scanning unit is located.

6. An optical position-measuring device, comprising:
a measuring standard;
a scanning unit movable relative to the measuring standard along at least one measuring direction, a scanning beam path being formed between the measuring standard and scanning unit; and
a protective cap movable along an axis perpendicular to a measuring-standard plane such that in at least one operating mode, the protective cap surrounds the scanning beam path between the scanning unit and measuring standard at least in a spatial area in which the scanning beam path is sensitive to variations in refractive index;
wherein the protective cap includes a resetting device adapted to automatically set, in the event that an energy supply fails, a maximum distance between the protective cap and the measuring standard.

7. The position-measuring device according to claim 6, wherein the resetting device includes spring elements adapted to mechanically preload the protective cap.

8. The position-measuring device according to claim 1, wherein an outer contour of the protective cap is shaped such that no air turbulences arise due to air circumflowing the protective cap.

9. The position-measuring device according to claim 1, wherein an outer contour of the protective cap is shaped such that no forces result on the measuring standard due to air circumflowing the protective cap.

10. An optical position-measuring device, comprising:
a measuring standard;
a scanning unit movable relative to the measuring standard along at least one measuring direction, a scanning beam path being formed between the measuring standard and scanning unit; and
a protective cap movable along an axis perpendicular to a measuring-standard plane such that in at least one operating mode, the protective cap surrounds the scanning beam path between the scanning unit and measuring standard at least in a spatial area in which the scanning beam path is sensitive to variations in refractive index;
wherein the protective cap includes at least one flow element formed such that ram and suction pressure on the protective cap cancels out with dynamic pressures on the flow element at a certain velocity of a traversing table on which the scanning unit is located.

11. The position-measuring device according to claim 10, wherein the flow element includes an air baffle provided on a side of the protective cap.

12. The position-measuring device according to claim 1, wherein the protective cap is rotatable about an axis perpendicular to a plane of the measuring standard.

13. The position-measuring device according to claim 1, wherein the protective cap extends along an axis perpendicular to a plane of the measuring standard, and has an extension along the axis that is slightly less than a distance between the measuring standard and the scanning unit.

14. The position-measuring device according to claim 1, wherein the protective cap is cylindrical, a cylinder axis extending along an axis perpendicular to a plane of the measuring standard.

15. The position-measuring device according to claim 1, wherein the protective cap includes an aperture and/or a light-transmitting cover element on a side facing the measuring standard.

16. The position-measuring device according to claim 2, further comprising magnetic and/or pneumatic actuators adapted to position the protective cap in defined manner along the axis.

17. The position-measuring device according to claim 16, wherein the actuators are adapted to maintain a constant distance between the protective cap and the measuring standard regardless of a position of a traversing table on which the scanning unit is located.

18. The position-measuring device according to claim 2, wherein the protective cap includes a resetting device adapted to automatically set, in the event that an energy supply fails, a maximum possible distance between the protective cap and the measuring standard.

19. The position-measuring device according to claim 18, wherein the resetting device includes spring elements adapted to mechanically preload the protective cap.

20. The position-measuring device according to claim 2, wherein an outer contour of the protective cap is shaped such that no air turbulences arise due to air circumflowing the protective cap.

21. The position-measuring device according to claim 2, wherein an outer contour of the protective cap is shaped such that no forces result on the measuring standard due to air circumflowing the protective cap.

22. The position-measuring device according to claim 2, wherein the protective cap includes at least one flow element formed such that ram and suction pressure on the protective cap cancels out with dynamic pressures on the flow element at a certain velocity of a traversing table on which the scanning unit is located.

23. The position-measuring device according to claim 22, wherein the flow element includes an air baffle provided on a side of the protective cap.

24. The position-measuring device according to claim 2, wherein the protective cap is rotatable about an axis perpendicular to a plane of the measuring standard.

25. The position-measuring device according to claim 2, wherein the protective cap extends along an axis perpendicular to a plane of the measuring standard, and has an extension along the axis that is slightly less than a distance between the measuring standard and the scanning unit.

26. The position-measuring device according to claim 2, wherein the protective cap is cylindrical, a cylinder axis extending along an axis perpendicular to a plane of the measuring standard.

27. The position-measuring device according to claim 2, wherein the protective cap includes an aperture and/or a light-transmitting cover element on a side facing the measuring standard.

28. The position-measuring device according to claim 10, wherein an outer contour of the protective cap is shaped such that no air turbulences arise due to air circumflowing the protective cap.

29. The position-measuring device according to claim 10, wherein an outer contour of the protective cap is shaped such that no forces result on the measuring standard due to air circumflowing the protective cap.

30. The position-measuring device according to claim 6, wherein a distance between the protective cap and the measuring standard: is adjustable in a first operating mode to a distance value such that the protective cap shields the scanning beam path between the scanning unit and measuring standard at least in a spatial area sensitive to variations in the refractive index; and in at least a second operating mode, is adjustable to a greater distance value than in the first operating mode.

31. The position-measuring device according to claim 6, further comprising magnetic and/or pneumatic actuators adapted to position the protective cap in defined manner along the axis.

32. The position-measuring device according to claim 6, wherein an outer contour of the protective cap is shaped such that no forces result on the measuring standard due to air circumflowing the protective cap.

33. The position-measuring device according to claim 6, wherein the protective cap is rotatable about an axis perpendicular to a plane of the measuring standard.

34. The position-measuring device according to claim 6, wherein the protective cap includes an aperture and/or a light-transmitting cover element on a side facing the measuring standard.

* * * * *